United States Patent [19]

Tucek et al.

[11] Patent Number: 5,005,377
[45] Date of Patent: Apr. 9, 1991

[54] SCRAP FREEZING TUNNEL

[76] Inventors: Miroslav Tucek, 142 Woodside Avenue, Apt. 203, Cambridge, Ontario, Canada, N1S 4A9;

[21] Appl. No.: 442,636

[22] Filed: Nov. 29, 1989

[51] Int. Cl.$^5$ .......................................... F25D 17/02
[52] U.S. Cl. ........................................ 62/374; 62/381
[58] Field of Search ..................... 62/381, 374; 241/23

[56] References Cited

U.S. PATENT DOCUMENTS

| | | | |
|---|---|---|---|
| 3,015,219 | 1/1962 | Veyrie | 62/381 |
| 3,213,634 | 10/1965 | Granata | 62/381 |
| 3,992,899 | 11/1976 | Spahn | 62/381 |
| 4,033,142 | 7/1977 | Schorsch et al. | 62/381 |
| 4,124,997 | 11/1978 | Sadjina et al. | 62/381 |
| 4,697,508 | 10/1987 | Tallafus | 62/381 |
| 4,914,927 | 4/1990 | Miller et al. | 62/381 |

Primary Examiner—Ronald C. Capossela
Attorney, Agent, or Firm—Mirek A. Waraksa

[57] ABSTRACT

A tunnel for freezing scrap is adapted to reduce consumption of volatile liquid cryogens. The tunnel is supported in an inclined orientation and rotated to move scrap from a scrap inlet to a scrap outlet. A liquid cryogen is injected into the tunnel. The scrap inlet may incorporate a screw drive or other mechanism to reduce loss of gaseous cryogenic material. An exhaust conduit permits discharge of spent gaseous cryogen. The temperature of the spent gas is sensed and indicated, and the rate at which spent cryogen is exhausted and fresh cryogen is introduced is varied with the temperature. A discharge end of the tunnel contains an annular plate which prevents free discharge of liquid cryogen. A longitudinal rib attached to the interior surface of the tunnel adjacent the plate lifts scrap from liquid cryogen accumulating at the plate and drops the scrap through the central opening. The plate is inclined relative to the rotational axis of the tunnel so that the opening in the plate is angled to properly receive the scrap. The rate of processing is controlled by varying both the rotational speed and inclination of the tunnel so that different degrees of tumbling action can be provided at a desired processing speed.

15 Claims, 4 Drawing Sheets

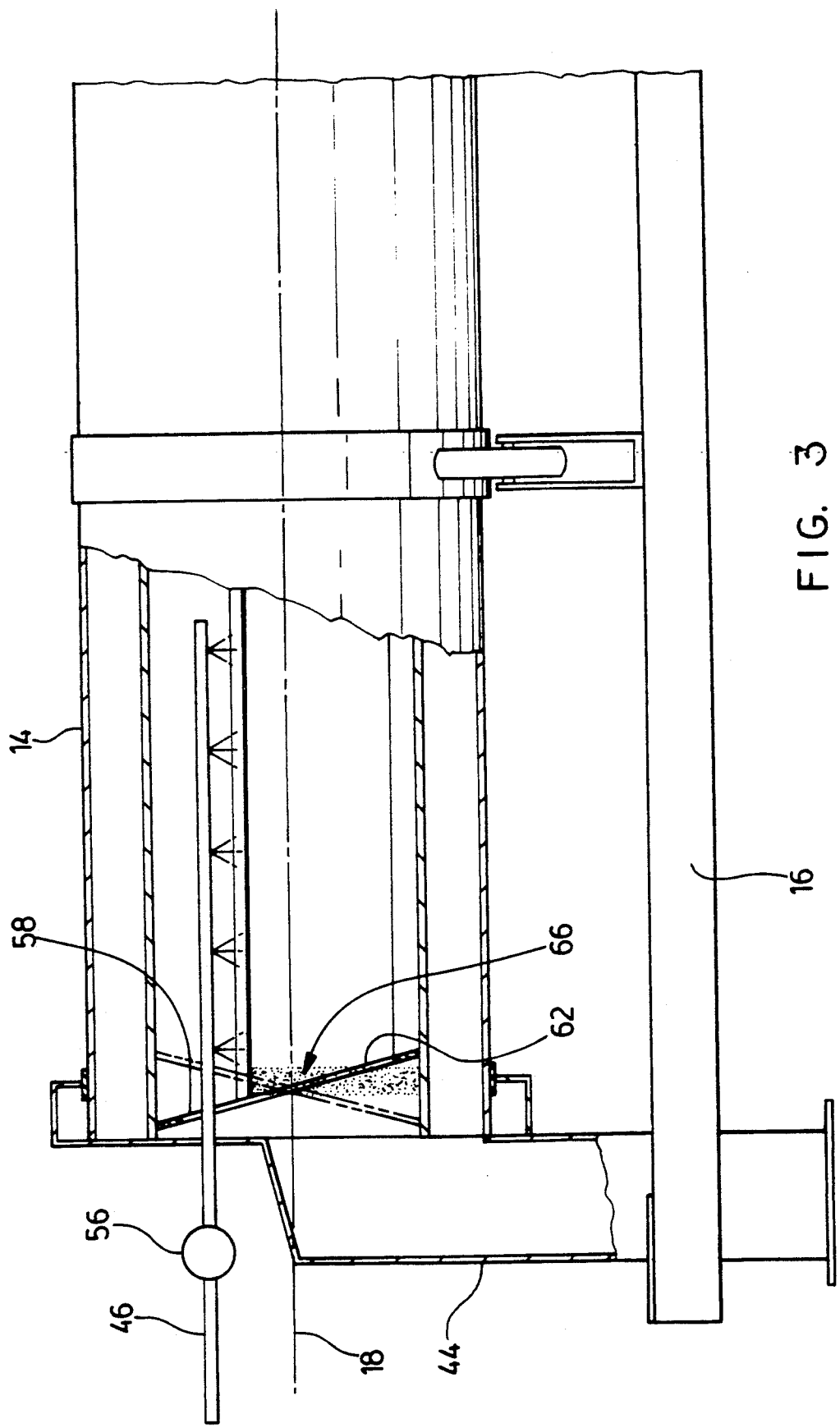

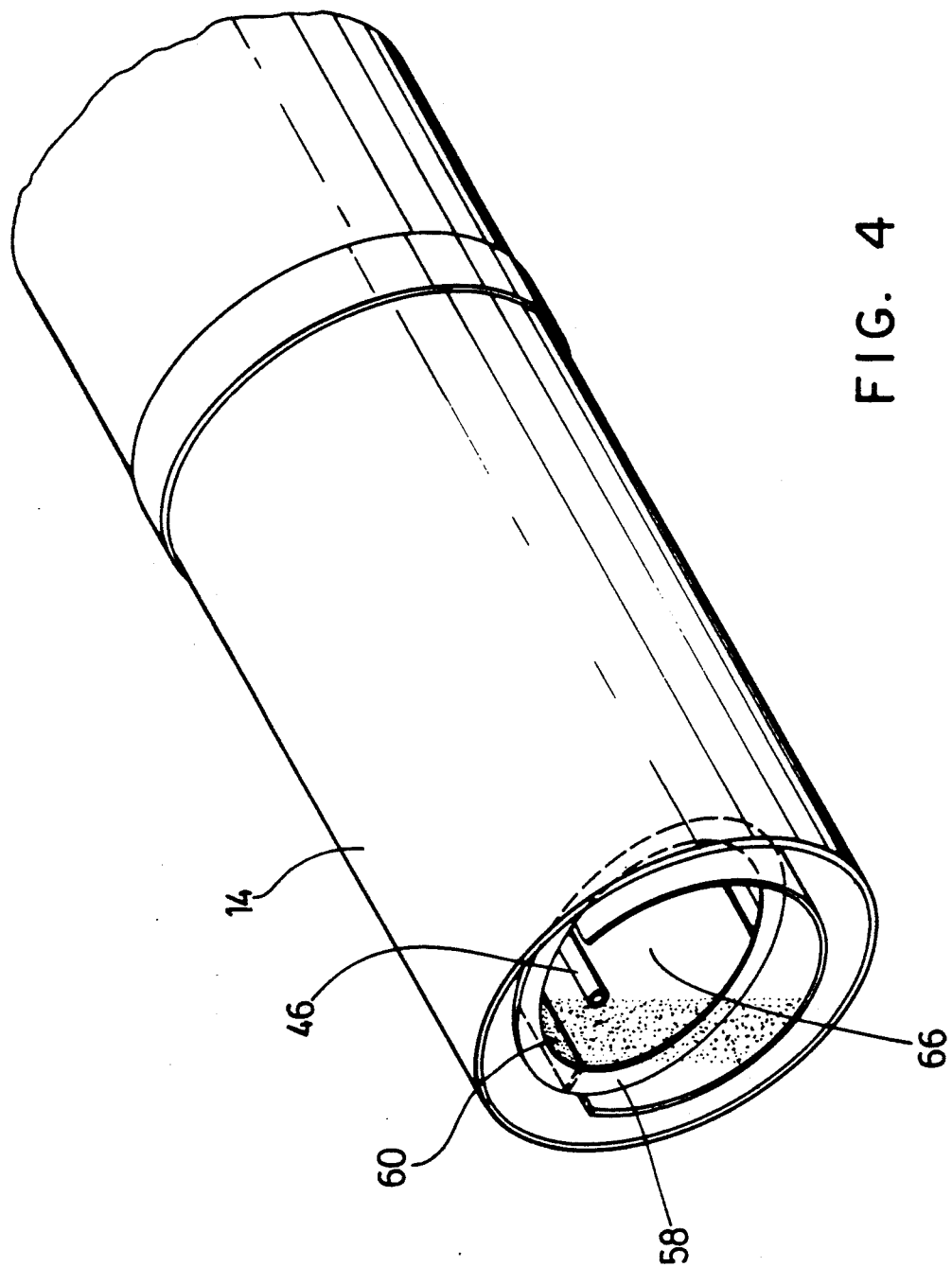

SCRAP FREEZING TUNNEL

FIELD OF THE INVENTION

The invention relates to recycling of scrap by freezing and shattering, and more particularly, to apparatus used to freeze scrap for such purposes.

BACKGROUND OF THE INVENTION

Freezing tunnels for use in recycling scrap are known. An exemplary tunnel was proposed by the present inventor in Canadian patent No. 1,136,594 which issued on Nov. 30, 1982. That patent describes an insulated freezing tunnel which is inclined and rotated to convey scrap from a receiving end of the tunnel to a discharge end of the tunnel. Liquid nitrogen is injected into the tunnel and freezes the scrap during transit. At the discharge end of the tunnel, the scrap might typically be delivered to a hammer mill which shatters the frozen materials.

The cost of operating a freezing tunnel is determined in large measure by the quantity of liquid cryogen required. In the past, nitrogen in gaseous form has been allowed to escape freely from the tunnel and such discharge would occur before the gas was fully spent. It would be desirable to avoid such waste of cryogenic material and to provide more thorough transfer of heat to the spent gas before discharge.

Another shortcoming associated with prior freezing tunnels is actual loss of liquid cryogen at the discharge end of the tunnel. The scrap locates principally at the bottom of the tunnel and is often immersed in liquid cryogen. At the discharge end of the tunnel, the liquid cryogen escapes with the scrap into the associated hammer mill. Reducing loss of liquid cryogen in this manner is difficult as obstruction of liquid flows necessarily obstructs the discharge of solid scrap.

Another problem with prior practices is clinging of fine scrap, such as certain plastics, to the walls of the tunnel. The scrap can be lifted from the tunnel walls by providing ribs to enhance tumbling action and by increasing the rate of tunnel rotation. However, increasing the rate of tunnel rotation incidentally increases the rate of transport of the materials and the residence time within the tunnel. This hampers the ability to process scrap at appropriate speeds.

The present invention in its various aspects addresses these and other shortcomings associated with prior freezing tunnels.

SUMMARY OF THE INVENTION

In one aspect, the invention provides apparatus for freezing scrap comprising a tunnel having a central longitudinal axis. An inlet communicates with the interior of the tunnel for delivery of scrap into a receiving end portion of the tunnel. An outlet communicates with the interior of the tunnel for discharge of the scrap at a discharge end portion of the tunnel. Means are provided for supporting the tunnel for rotation about its central longitudinal axis, inclined downwardly from the receiving end portion to the discharge end portion. Means are provided for rotating the tunnel to cause movement of scrap between the receiving and discharge end portions. Means are also provided for delivering volatile cryogenic material into the interior of the tunnel for freezing of the scrap in transit. The term "volatile" as used herein should be understood as designating a material which is either a gas, a liquid which tends to transform readily into a gas, or a combination thereof. Means are provided for closing the tunnel sufficiently that spent cryogenic material in a gaseous state accumulates in the tunnel. An exhaust outlet communicates with the interior of the tunnel for discharge of spent cryogenic material in a gaseous state. Means are provided for sensing and indicating the temperature of the spent gases. Variable flow generating means produce a discharge flow of the spent gaseous cryogenic material from the interior of the tunnel through the exhaust outlet and permit the rate of flow to be varied in response to the indicated temperature. The flow generating means may be manually operated in response to indicated temperature or may be automatically controlled in response to the temperature. This permits more effective use of costly liquid cryogens. In preferred form, delivery of cryogenic material is also controlled in response to the sensed temperature of the spent gaseous cryogen.

In another aspect of the invention, the apparatus is adapted to reduce the escape of liquid cryogenic material through the scrap outlet. An obstruction is formed at the interior surface of the tunnel tunnel discharge end portion preventing liquid cryogenic material accumulated at the bottom of the tunnel from escaping into the scrap outlet. A passage is spaced from the bottom of the tunnel and communicates with the scrap outlet. A scrap lifting member is fixed to the tunnel and extending inwardly from the interior surface of the tunnel, the scrap lifting member being so positioned relative to the obstruction and so shaped that the lifting member raises and separates scrap from the accumulated cryogenic material and drops the raised scrap into the passage in response to rotation of the tunnel. The passage may have an open end confronting the scrap moving from the tunnel receiving end portion towards the tunnel discharge end portion which is inclined relative to the central longitudinal axis of the tunnel to facilitate receipt of the raised scrap. The preferred form of the obstruction is a simple plate actually fixed to the tunnel itself and having a central opening, the plate being inclined relative to the central axis of the tunnel.

Other aspects and advantages associated with the present invention will be apparent from a description below of a preferred embodiment and will be more specifically defined in the appended claims.

BRIEF SUMMARY OF THE INVENTION

The invention will be better understood with the reference to drawings in which:

FIG. 3 is an enlarged, fragmented elevational view of a discharge end portion of the tunnel detailing structure for retaining liquid cryogens;

FIG. 4 is a fragmented perspective view of a discharge end portion of the tunnel indicating a mechanism for separating solid scrap from liquid cryogens.

DESCRIPTION OF PREFERRED EMBODIMENT

Figure 1:
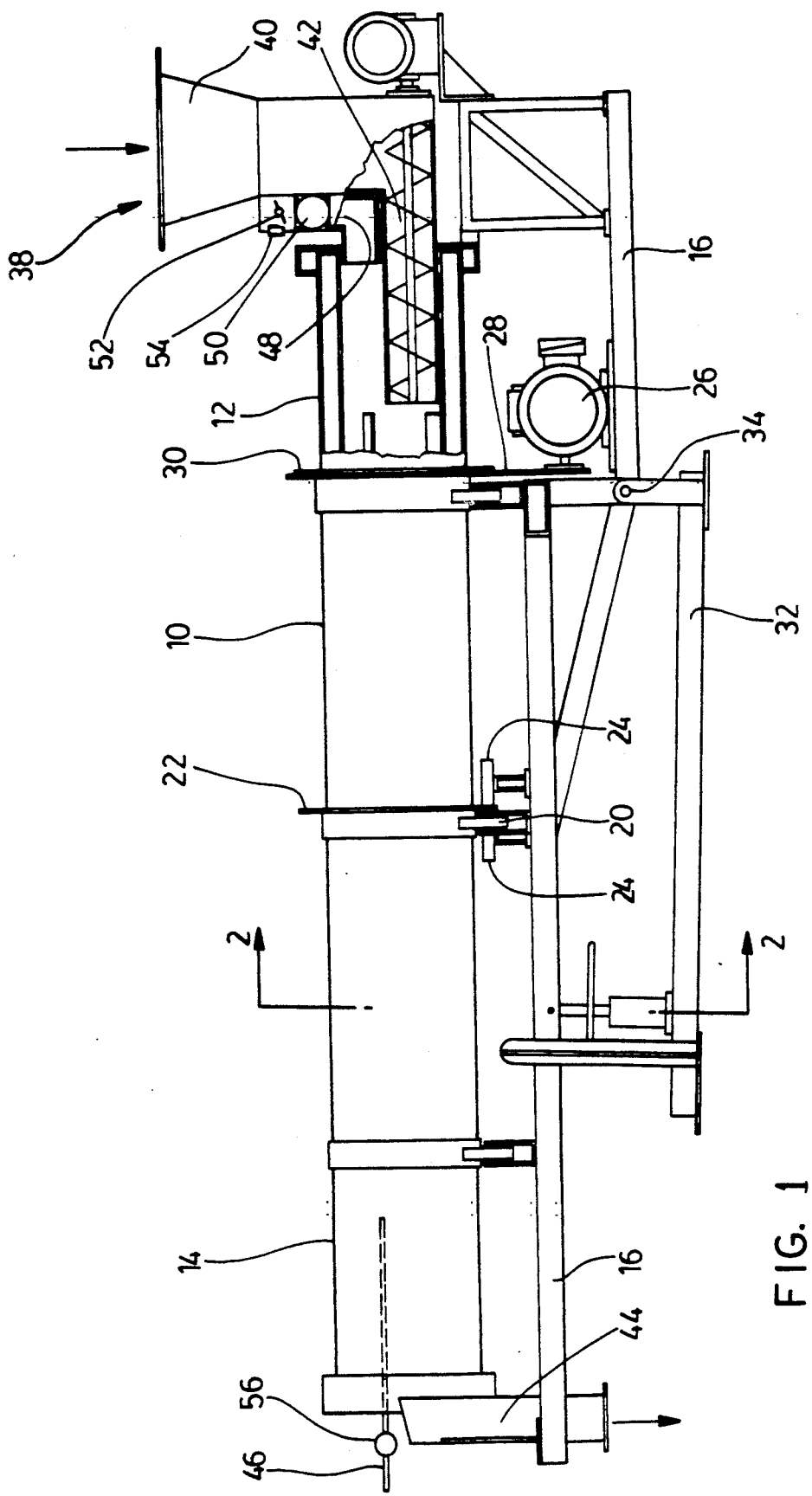
FIG. 1 is a side elevation of a freezing tunnel apparatus.
Figure 2:
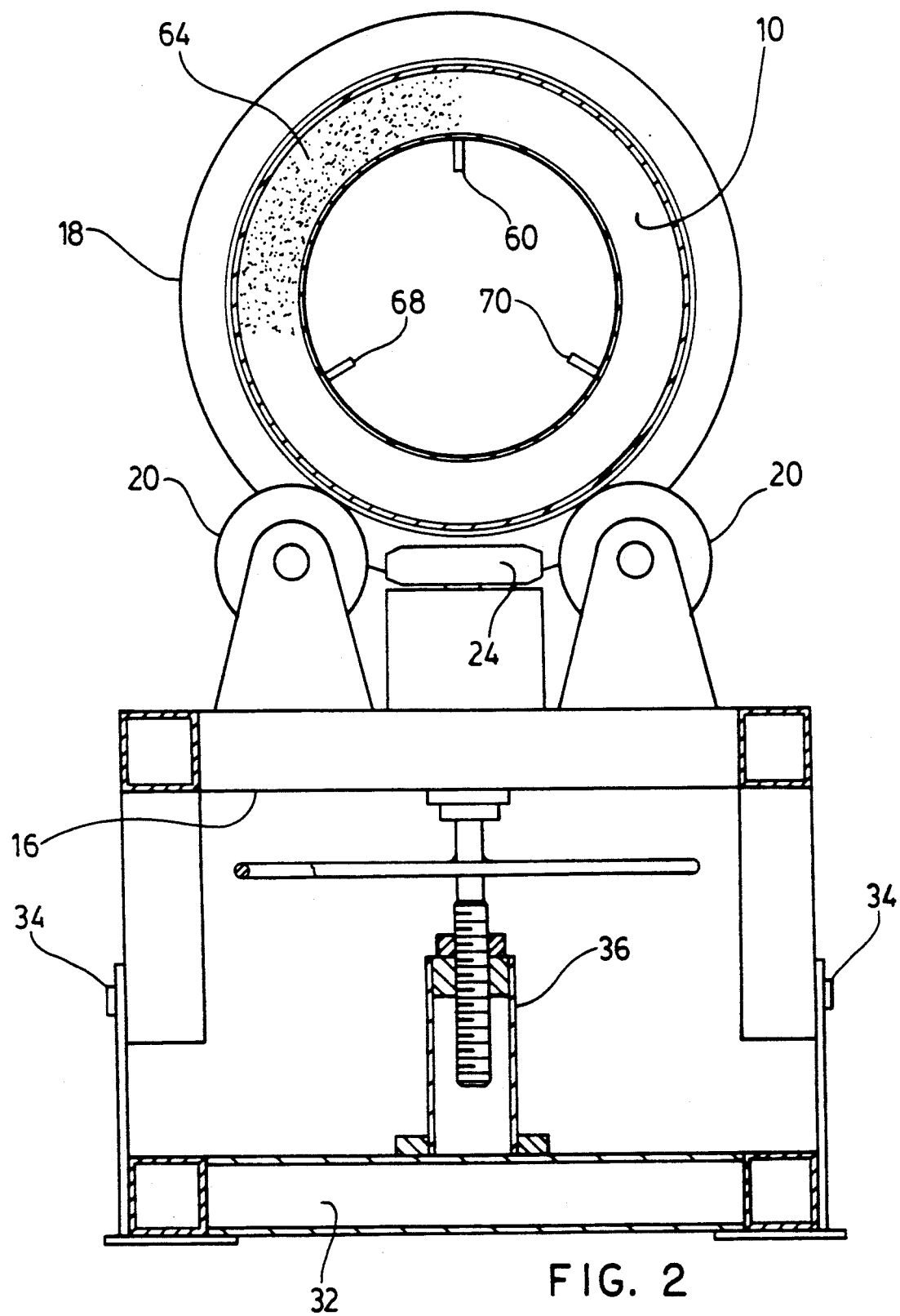
FIG. 2 is a view along the lines 2-2 of FIG. 1 illustrating how a tunnel is supported and illustrating apparatus for changing the tunnel's inclination.

Reference is made FIG. 1 which diagrammatically illustrates apparatus for freezing scrap. The apparatus includes an insulated tunnel 10 having a scrap receiving end portion 12 and a scrap discharge end portion 14. The tunnel 10 is mounted on a steel support structure 16 for rotation about its longitudinal axis 18 (indicated in FIG. 2). Three pairs of rollers attached to the support structure 16 support the tunnel 10 intermediate its ends for rotation about its central longitudinal axis 18. Only one central pair of rollers is specifically indicated with reference number 20 in FIGS. 1 and 2. These rollers 20 have their rotational axes (not illustrated) aligned with the central longitudinal axis 18 of the tunnel 10 and engage an outer surface of the tunnel structure. A circumferential flange 22 and another pair of rollers 24 prevent axial displacement of the tunnel 10 in response to its inclination. The flange 22 is simply attached to the exterior of the tunnel 10 generally perpendicular to the central longitudinal axis 18 of the tunnel 10. The two rollers 24 are attached to the support structure 16 with their rotational axis vertical, perpendicular to the central longitudinal axis 18 of the tunnel 10. The flange 22 is wedged between the rollers 24 which consequently prevent axial displacement. A conventional adjustment mechanism may be provided to permit displacement of one of the pair of rollers 20 such that spacing relative to the flange 22 can be adjusted. A variable speed motor 26 is mounted on an extension of the support structure 16. It is coupled in a conventional manner to the tunnel 10 by a chain 28 and a sprocket wheel 30 attached to the exterior of the tunnel 10 to cause rotation of the tunnel 10.

The support structure 16 is itself mounted on a stationary steel base 32. Hinges 34 define a pivot connection which joins the support structure 16 to the base 32. A manually-operable hydraulic jack 36 acting between the base 32 and the support structure 16, spaced from the hinges, permits pivoting of the support structure 16 relative to the base 32 about the pivot connection. The inclination of the tunnel 10 can consequently be selected substantially as desired by appropriate operation of the jack 36. Mounting of the motor 26 and various rollers on the support structure 16 immediately engaging the tunnel 10 is important to ensure that motor 26 and rollers remains operatively coupled to the tunnel 10 despite tilting. It should be noted that the maximum inclination of the tunnel 10 relative to horizontal in this embodiment is limited to about 15 degrees.

A metal inlet 38, including a hopper 40, is mounted on the support structure 16 at the tunnel receiving end portion 12. The inlet 38 communicates with the interior of the tunnel 10 for delivery of the scrap to the tunnel receiving end portion 12. A screw drive 42 is preferably provided at the base of the hopper 40 to drive scrap into the tunnel 10. One aspect of such a screw drive 42 is that it tends to close the receiving end portion 12 of the tunnel 10 against discharge of gaseous cryogens. It also tends to reduce the introduction of warm ambient air into the tunnel 10. A metal scrap outlet 44 is provided at the tunnel discharge end portion 14. This too is mounted on the support structure 16 for pivoting with the tunnel 10. An injection line 46 extends through the scrap outlet 44 into the discharge end portion 14 of the tunnel 10 to permit injection of liquid nitrogen under pressure from a source such as conventional metal bottles (not illustrated). The injection line 46 is formed with adjustable nozzles (not illustrated) that effectively spray the liquid downwardly onto the scrap in the bottom of the tunnel 10 much of the liquid evaporating upon injection. Discharge of gaseous cryogen at the discharge end portion 14 of the tunnel 10 is normally not critical, but if desired, a rotary gate mechanism or spring-biased baffles can be provided in the scrap outlet 44 to reduce the escape of gaseous cryogens and introduction of ambient air while permitting discharge of scrap. Seals may be formed between the scrap inlet 38, the scrap outlet 44 and the outer surface of the tunnel 10 to reduce undesired discharge of gaseous nitrogen. It should be noted, however, that absolute and precise sealing is not required for purposes of the invention and the cost of insuring gas-tight seals for such machinery would not normally be cost-justified. The benefits of the invention are obtained if the tunnel 10 is closed sufficiently to accumulate spent gases therefore allowing for controlled discharged.

An exhaust outlet 48 communicating with the interior of the tunnel 10 for discharge of spent nitrogen gas is provided at the base of the inlet hopper 40. (It is desirable in practice that the exhaust outlet 48 be coupled to a discharge stack, as with flexible tube, leading to points external to the plant where the apparatus is operated.) A fan unit 50 is mounted in the exhaust outlet 48 and a conventional manually-operable damper 52 in the exhaust outlet 48 permits the rate of discharge of spent nitrogen to be controlled. A temperature sensor 54 is mounted in the wall of the exhaust outlet 48 just outwardly of the fan unit 50 to sense the temperature of the spent gaseous nitrogen being exhausted, which temperature is visually indicated by the sensor 54 externally of the exhaust outlet 48. The temperature gives an indication of how rapidly the nitrogen is absorbing heat from the scrap. The arrangement permits the rate of discharging of spent nitrogen to be adjusted in response to temperature. Basically, the damper 52 is adjusted such that the flow rate is increased with increasing temperatures and reduced with declining temperatures. It is within the ambit of the invention to incorporate automatic control of either the damper 52 or the fan unit 50 itself (thereby eliminating the damper 52) to vary discharge flow rates in proportion to sensed and electronically indicated temperature. It should be appreciated, however, that a precision process is not practised in the freezing tunnel 10 and that such controls may not provide considerable additional advantage.

The delivery of fresh liquid nitrogen from a pressurized source is controlled by a manually-operable valve 56 diagrammatically illustrated in the injection line 46. The valve 56 can be manually adjusted in response to the indicated temperature of the exhaust gases to vary the rate of delivery of fresh liquid nitrogen in proportion to the sensed temperature. Basically, as the temperature of the spent gaseous nitrogen increases, the rate of delivery is increased. As the temperature drops, the rate of delivery is reduced. The rate of delivery can be varied automatically in response to sensed temperature, but once again automatic control may not provide significant advantages over manual control.

The apparatus is also adapted to reduce any significant loss of liquid nitrogen which might occur at the scrap outlet 44 in a more convention freezing tunnel 10. An apertured "wobble" plate 58 is provided. This is an annular member which is fitted tightly to interior surfaces of the tunnel 10 at the discharge end portion 14. It is inclined relative to the central longitudinal axis 18 of the tunnel 10 which for purposes of the invention should be understood as meaning that its general plane is not perpendicular to the tunnel axis 18. Accordingly, as the tunnel 10 rotates the plate 58 appears to go through a wobbling motion. One extreme of that wobbling motion is illustrated in solid outline in FIG. 3; the opposite extreme is illustrated in phantom outline. The plate 58 of course obstructs free discharge of liquid nitrogen accumulating at the bottom of the tunnel 10 through the scrap outlet 44.

A longitudinal rib 60 is attached to the tunnel 10 and extends inwardly from the tunnel's interior surface upstream of the wobble plate 58. The rib 60 tends to lift scrap from the bottom of the tunnel 10 and drop the scrap against the upstream face 62 of the wobble plate 58. (The term "upstream" as used herein should be understood as indicating a direction contrary to that in which materials such as scrap are moving.) The quadrant of rotation 64 where such dropping occurs has been indicated by dotted shading in FIG. 2 (assuming clockwise rotation of the tunnel in the plane of FIG. 2). Basically, the rib 60 is positioned circumferentially relative to the plate opening 66 such that the scrap is dropped into the opening 66 when the wobble plate 58 is in the orientation illustrated in solid outline in FIG. 3. The relative positioning is more apparent in the perspective view of FIG. 4 and dotted shading has been used in FIGS. 3 and 4 to indicate the dropping of scrap from the rib 60 through the plate opening 66. The rib 60 may typically be positioned relative to the plate such that the extreme orientation of the plate 58 shown in solid outline in FIG. 3 is achieved when the rib is substantially midway in the quadrant 64. In this orientation of the plate 58, the open end of the passage 66 confronting the scrap is inclined such that the material can readily fall through.

A number of points should be noted. While the exact construction of the annular member used is not critical, it very desirable for the open end of the passage of such a member confronting the scrap moving downstream from the tunnel receiving end portion 12 be inclined to facilitate receipt of the materials at least during actual dropping of the materials against the annular member. Any construction of the rib 60, including the shelf-like construction illustrated, which permits liquid nitrogen to flow from the rib 60 back to the bottom of the tunnel 10 as the rib 60 rotates with the tunnel 10 is appropriate. The rib 60 is apertured (not illustrated) at least adjacent the wobble plate 58 to enhance drainage back to the bottom of the tunnel 10 of liquid nitrogen raised with the scrap. Two other ribs 68, 70 are provided for tumbling scrap upstream of the wobble plate 58 (enhancing exposure of the scrap to the gaseous coolant), but do not assist in discharging materials through the wobble plate 58.

Operation of the tunnel 10 will largely be apparent from the foregoing description of its components. Liquid nitrogen may initially be injected into the empty tunnel 10 to achieve a desired operating temperature. For polyvinylchloride scrap this might typically be −45 degrees centigrade; for rubber products, −70 to −100 degrees centigrade. Scrap is introduced into the hopper 40 and is driven by the screw drive 42 into the interior of the tunnel 10. The scrap is exposed to gaseous coolant upstream of the injection line 46. In some instances, depending on the nature of the scrap being processed, the scrap may be deliberately mingled with liquid coolant adjacent the wobble plate 58 to thoroughly freeze the scrap. In other applications, the nozzles used to spray the liquid coolant into the tunnel 10 and the rate of delivery may be adjusted to reduce the amount of liquid coolant which accumulates. At the tunnel discharge end portion 14, the frozen scrap is raised by the rib 60 thereby separating it from any liquid cryogen and is dropped through the central opening of the wobble plate 58 for discharge through the scrap outlet 44.

The gas temperature indicated by the sensor 54 will be monitored closely during start-up. The rate of exhausting of gas will be adjusted and the rate of delivery of fresh liquid nitrogen adjusted in general proportion to the indicated temperature until steady-state operation is achieved. If the exhaust temperature is too high, the rates of discharge of spent gaseous nitrogen and delivery of fresh liquid nitrogen are increased. However, if the temperature of the exhaust gas drops, indicating that the spent gas can still be used to advantage to draw heat from incoming scrap, then the rate of discharge of spent gas is slowed as is the rate of delivery of fresh liquid nitrogen.

If scrap of a type which is known to cling to the tunnel 10 is being processed, the speed of tunnel rotation can be increased to provide greater tumbling action. To permit appropriate residence time despite the increased rotational speed, the inclination of the tunnel 10 can be decreased by appropriate operation of the hydraulic jack 36.

A screw drive feed mechanism is preferred for delivery of small particulate scrap. As mentioned above, a screw drive tends to reduce loss of gaseous nitrogen and introduction of ambient air. If large items of scrap are to be processed, and a screw drive is inappropriate, spring-operated baffles may be provided in the scrap inlet to reduce gas transfer. Alternatively, a rotary gate with several radial doors might be used.

It will be appreciated that a particular embodiment of the invention has been described and that modifications may be made therein without departing from the spirit of the invention or necessarily departing from the scope of the appended claims.

I claim:

1. Apparatus for freezing scrap, comprising:
   means defining a tunnel having a central longitudinal axis;
   means defining a scrap inlet communicating with the interior of the tunnel for delivery of scrap into a receiving end portion of the tunnel
   means defining a scrap outlet communicating with the interior of the tunnel for discharge of scrap from a discharge end portion of the tunnel;
   means supporting the tunnel for rotation about its central longitudinal axis and inclined downwardly from the tunnel receiving end portion to the tunnel discharge end portion;
   means for rotating the tunnel to cause movement of scrap from the tunnel receiving end portion to the tunnel discharge end portion;
   means for delivering volatile cryogenic material into the interior of the tunnel;
   means closing the tunnel sufficiently that spent cryogenic material in a gaseous state accumulates in the tunnel;
   means defining an exhaust outlet communicating with the interior of the tunnel for discharge of the spent gaseous cryogenic material;
   temperature sensing means for sensing and indicating the temperature of the spent gaseous cryogenic material;
   variable flow generating means for producing a discharge flow of the spent gaseous cryogenic material from the interior of the tunnel through the exhaust outlet and for permitting the rate of flow to be varied in response to the indicated temperature.

2. The apparatus of claim 1 in which the variable flow generating means comprise:
   a fan unit; and
   damper means mounted in the exhaust outlet for controlling gas flows through the exhaust outlet.

3. The apparatus of claim 1 adapted to reduce the escape of liquid cryogenic material from the interior of the tunnel through the scrap outlet, comprising:
   means defining an obstruction at the interior surface of the tunnel discharge end portion preventing liquid cryogenic material accumulated at the bottom of the tunnel from escaping into the scrap outlet and defining a passage spaced from the bottom of the tunnel that communicates with the scrap outlet;
   a scrap lifting member fixed to the tunnel and extending inwardly from the interior surface of the tunnel, the scrap lifting member being so positioned relative to the obstruction and so shaped that the lifting member raises and separates scrap from the accumulated cryogenic material and drops the raised scrap into the passage in response to rotation of the tunnel.

4. The apparatus of claim 3 in which the passage is located substantially centrally within the obstruction and has an open end confronting scrap moving from the tunnel receiving end portion towards the tunnel discharge end portion, the open end being inclined relative to the central longitudinal axis of the tunnel for receipt of the dropped scrap.

5. A freezing tunnel as claimed in claim 4 in which the lifting member is apertured to permit drainage to the bottom of the freezing tunnel of liquid cryogenic material raised with the scrap material.

6. The apparatus of claim 1 adapted to reduce the escape of liquid cryogenic material from the interior of the tunnel through the scrap outlet, comprising:
   an annular plate attached to and circumscribing the interior surface of the tunnel at the tunnel discharge end portion such that liquid cryogenic material accumulated at the bottom of the tunnel is prevented from escaping into the scrap outlet, the annular plate being inclined relative to the central longitudinal axis of the tunnel and having a central opening;
   a scrap lifting member fixed to the tunnel and extending inwardly from the interior surface of the tunnel proximate to the plate, the scrap lifting member being so positioned relative to the plate and so shaped that the lifting member raises and separates scrap from the accumulated cryogenic material and drops the raised scrap through the opening in response to rotation of the tunnel.

7. The apparatus of claim 6 in which the lifting member is apertured to permit drainage to the bottom of the freezing tunnel of liquid cryogenic material raised with the scrap material.

8. The apparatus of claim 1 in which:
   the support means comprise a base, a support structure, means connecting the support structure to the base such that the support structure can pivot relative to the base, means attached to the support structure and securing the tunnel to the support structure such that the tunnel is rotatable about its longitudinal axis, and means for selectively pivoting the support structure relative to the base to vary the inclination of the tunnel; and,
   the means for rotating the tunnel comprise motor means mounted on the support structure and means coupling the motor means to the tunnel such that the motor means rotate the tunnel.

9. Apparatus for freezing scrap, comprising:
   means defining a tunnel having a central longitudinal axis and an interior surface;
   means defining a scrap inlet communicating with the interior of the tunnel for delivery of scrap into a receiving end portion of the tunnel;
   means defining a scrap outlet communicating with the interior of the tunnel for discharge of scrap from a discharge end portion of the tunnel;
   means supporting the tunnel for rotation about its central longitudinal axis and inclined downwardly from the tunnel receiving end portion to the tunnel discharge end portion;
   means for rotating the tunnel to cause movement of scrap from the tunnel receiving end portion to the tunnel discharge end portion;
   means for delivering volatile cryogenic material into the interior of the tunnel;
   means defining an obstruction at the interior surface of the tunnel discharge end portion preventing liquid cryogenic material accumulated at the bottom of the tunnel from escaping into the scrap outlet and defining a passage spaced from the bottom of the tunnel that communicates with the scrap outlet;
   a scrap lifting member fixed to the tunnel and extending inwardly from the interior surface of the tunnel, the scrap lifting member being so positioned relative to the obstruction and so shaped that the lifting member raises and separates scrap from the accumulated cryogenic material and drops the raised scrap into the passage in response to rotation of the tunnel.

10. The apparatus of claim 9 in which the passage is located substantially centrally within the obstruction and has an open end confronting scrap moving from the tunnel receiving end portion towards the tunnel discharge end portion, the open end being inclined relative to the central longitudinal axis of the tunnel for receipt of the dropped scrap.

11. The apparatus of claim 9 comprising:
   means closing the tunnel sufficiently that spent cryogenic material in a gaseous state accumulates in the tunnel;
   means defining an exhaust outlet communicating with the interior of the tunnel for discharge of the spent gaseous cryogenic material;
   temperature sensing means for sensing and indicating the temperature of the spent gaseous cryogenic material;
   variable flow generating means for producing a discharge flow of the spent gaseous cryogenic material from the interior of the tunnel through the exhaust outlet and for permitting the rate of flow to be varied in response to the indicated temperature.

12. The apparatus of claim 9 in which:
   the support means comprise a base, a support structure, means connecting the support structure to the base such that the support structure can pivot relative to the base, means attached to the support structure and securing the tunnel to the support structure such that the tunnel is rotatable about its longitudinal axis, and means for selectively pivoting the support structure relative to the base to vary the inclination of the tunnel; and, the means for rotating the tunnel comprise motor means mounted on the support structure and means coupling the motor means to the tunnel such that the motor means rotate the tunnel.

13. Apparatus for freezing scrap, comprising:

means defining a tunnel having a central longitudinal axis and an interior surface;

means defining a scrap inlet communicating with the interior of the tunnel for delivery of scrap into a receiving end portion of the tunnel;

means defining a scrap outlet communicating with the interior of the tunnel for discharge of scrap from a discharge end portion of the tunnel;

means supporting the tunnel for rotation about its central longitudinal axis and inclined downwardly from the tunnel receiving end portion to the tunnel discharge end portion;

means for rotating the tunnel to cause movement of scrap from the tunnel receiving end portion to the tunnel discharge end portion;

means for delivering volatile cryogenic material into the interior of the tunnel;

an annular plate attached to and circumscribing the interior surface of the tunnel at the tunnel discharge end portion such that liquid cryogenic material accumulated at the bottom of the tunnel is prevented from escaping into the scrap outlet, the annular plate being inclined relative to the central longitudinal axis of the tunnel and having a central opening;

a scrap lifting member fixed to the tunnel and extending inwardly from the interior surface of the tunnel proximate to the plate, the scrap lifting member being so positioned relative to the plate and so shaped that the lifting member raises and separates scrap from the accumulated cryogenic material and drops the raised scrap through the opening in response to rotation of the tunnel.

14. The apparatus of claim 13 comprising:

means closing the tunnel sufficiently that spent cryogenic material in a gaseous state accumulates in the tunnel;

means defining an exhaust outlet communicating with the interior of the tunnel for discharge of the spent gaseous cryogenic material;

temperature sensing means for sensing and indicating the temperature of the spent gaseous cryogenic material;

variable flow generating means for producing a discharge flow of the spent gaseous cryogenic material from the interior of the tunnel through the exhaust outlet and for permitting the rate of flow to be varied in response to the indicated temperature.

15. The apparatus of claim 13 in which:

the support means comprise a base, a support structure, means connecting the support structure to the base such that the support structure can pivot relative to the base, means attached to the support structure and securing the tunnel to the support structure such that the tunnel is rotatable about its longitudinal axis, and means for selectively pivoting the support structure relative to the base to vary the inclination of the tunnel; and, the means for rotating the tunnel comprise motor means mounted on the support structure and means coupling the motor means to the tunnel such that the motor means rotate the tunnel.

* * * * *